(12) United States Patent
MacKelvie

(10) Patent No.: US 6,341,702 B1
(45) Date of Patent: Jan. 29, 2002

(54) FILING RACK

(76) Inventor: Winston MacKelvie, P.O. Box 1156 20 Kimball Road, Knowlton, Quebec (CA), J0E 1V0

( * ) Notice: Subject to any disclaimer, the term of this patent is extended or adjusted under 35 U.S.C. 154(b) by 0 days.

(21) Appl. No.: 09/706,062

(22) Filed: Nov. 6, 2000

Related U.S. Application Data

(60) Provisional application No. 60/163,191, filed on Nov. 3, 1999.

(51) Int. Cl.$^7$ .................................................. A47F 5/00
(52) U.S. Cl. ...................... 211/40; 211/41.12; 211/49.1; 312/9.48; D6/407
(58) Field of Search ................................ 211/40, 41.12, 211/49.1, 50, 89.01; 312/9.9, 9.47, 9.48, 9.56; D6/407

(56) References Cited

U.S. PATENT DOCUMENTS

| | | | | |
|---|---|---|---|---|
| 4,366,903 A | * | 1/1983 | Gaiser et al. | 211/40 X |
| 4,715,669 A | * | 12/1987 | Baillie et al. | 211/40 X |
| 5,193,891 A | * | 3/1993 | Headley | |
| 5,341,943 A | * | 8/1994 | Fraser | 211/40 |
| 5,980,002 A | * | 11/1999 | Crowe | 312/9.48 |
| 6,193,336 B1 | * | 2/2001 | Jencka | 312/9.57 |
| 6,196,647 B1 | * | 3/2001 | Kupferschmid | 211/41.12 X |
| 6,203,129 B1 | * | 3/2001 | Kupferschmid | 312/9.48 |

\* cited by examiner

*Primary Examiner*—Robert W. Gibson, Jr.

(57) ABSTRACT

The present invention is a rack for articles such as compact discs (CD's) video tapes, audio cassettes, trays, boxes (media) and the like. The rack is made to fit the media size being racked and filed. What is new and novel about the present rack is that it provides means to freely slide the media directly to a new position in the rack without having to remove media in the rack. This quick refiling to make room for additional media to maintain proper filing sequence and thereby maintain desired filing order. The rack will hold the media in any position: vertical; horizontal; upside down; and in a rotating filing wheel. The invention has opposing channel structures each with compressible elements therein such that media inserted between the fixed channels must compress the elements thereby creating a side-to-side holding (compressive) force sufficient to hold the media at any location along the rack without direct support as in shelves, clips, notches, and the like.

5 Claims, 1 Drawing Sheet

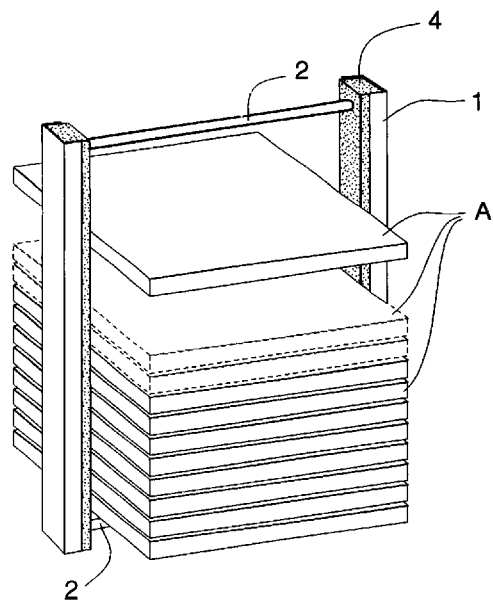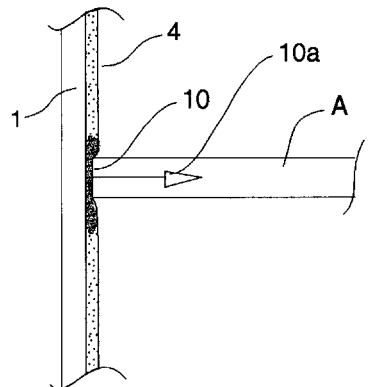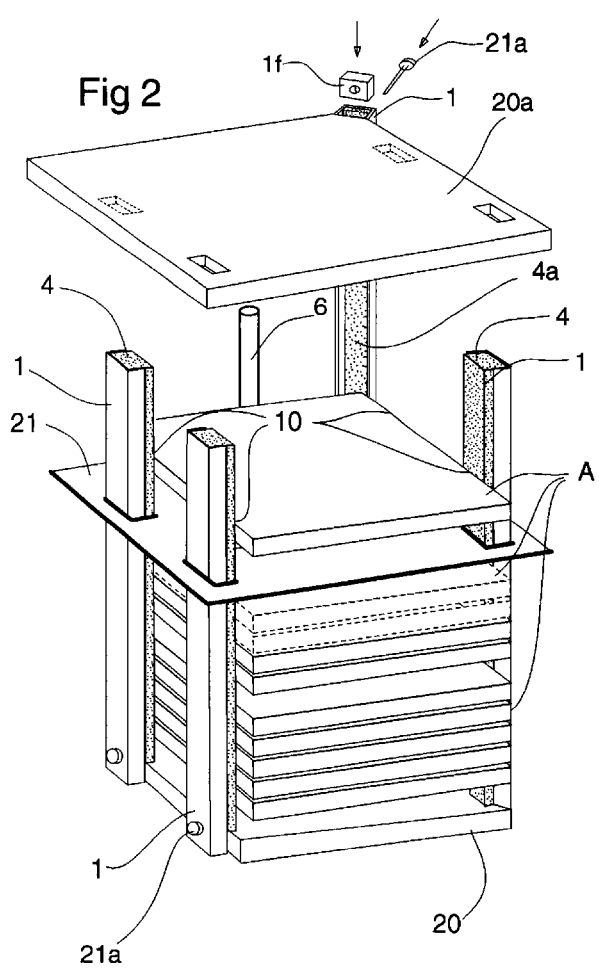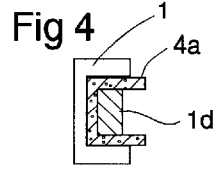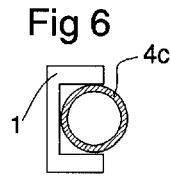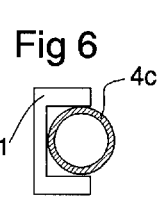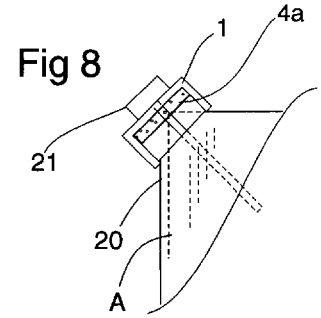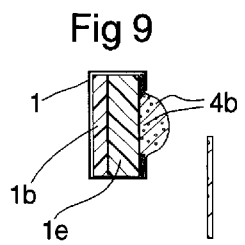

FILING RACK

The present application is a continuation-in-part of application Ser. No. 60/163,191, filed Nov. 3, 1999.

FIELD OF THE INVENTION

Racks, storage shelves, brackets, trays, clips and other devices for the holding of entertainment media such as compact discs (CD), CD-ROMs, and cassette and video tapes are well known and widely available. They come in two general forms, one for horizontal use and the other for vertical use. The vertical racks offer the advantage of small space or footprint but suffer from the inability to allow easy insertion new media into a preferred location in the rack, such as alphabetical filing would require. That is, if a new media wants to be inserted in, say, the 'M" section of the rack, often the entire rack below the insertion point must be rearranged to make that space available, each time new media is added.

For the horizontal rack, a large footprint requirement makes it less viable in space-squeezed shelving or entertainment equipment's top surfaces.

Additionally, both varieties do not allow for downward-angled media retention as would be required for maximum-dense packing of the media on, for example, a rotating 'Roladex®-type' file system, or, for overhead storage/access.

BACKGROUND OF THE INVENTION

The present invention overcomes these disadvantages. The rack of the present invention comprises at least four fixed stanchions facing each other. Stanchions are channel-shaped co-operatively secured at their upper and lower ends to parallel end plates or other fixturing means. The four stanchions may be located substantially cornerwise to each end plate, forming an open sided, closed ended, box-shaped structure. Front stanchions may parallel while rear stanchions may be better attached to end plates at corner positions, that is, at about 45° to a centerline.

The front stanchion's open sides face each other and have compressible elements secured therein, a portion of said compressible elements protruding past the stanchion into the open space between said stanchions. The compressible element may be an elastomeric foam, fiber mat, bristle, spring, tubing, rope or other material chosen for the purpose. A preferred material is zero compression set urethane foam. The end plate width dimension is slightly greater that the width of the media thereby holding stanchions also at that same distance. Because the compressible elements protrude, inserting media into rack forces their compression. This creates the desired side-holding force.

By selecting the amount by which the compressible elements protrude from the stanchions, adequate side-holding force is generated allowing inserting, and removing, and the sliding the media along the stanchions between end plates. The rear stanchions set at a 45° angle and lined with compressible elements, provides a stop and additional support for the media.

BRIEF DESCRIPTION OF THE DRAWINGS

FIG. 1 Shows the invention in perspective it the simplest embodiment of the rack having two stanchions.

FIG. 2 Is a partially exploded perspective of a preferred embodiment rack having four stanchions and a sliding tension plate.

FIG. 3 Is close-up of the compression created between the media and the compressible element within one stanchion.

FIG. 4 Shows a compressible element held in stanchion by a filler piece.

FIG. 5 A cross-section view shows a channel-shaped rear stanchion with a longer rear leg to provide a stop for the media.

FIG. 6 A cross-section view of tubing used for the compressive element.

FIG. 7 Shows a doubled channel stanchion for increased stiffness.

FIG. 8 is a detail od a rear, corner-mounted stanchion.

FIG. 9 is a detail of a preferred method of using foam for compressible element forced out of flanged channel by two-piece backing strip.

DETAILED DESCRIPTION OF THE INVENTION

In all drawings stanchion 1 is a channel-shaped member of stiff material such as aluminum. Stanchion 1 may be of any convenient cross-section such as rectangular or with curved sides. In FIG. 9 stanchion 1 is shown in preferred form as a flanged channel. Stanchions 1 are held apart either by stiff rods/tubes 2, or by end plates 20, 20a and at a spacing slightly greater than the media A. End plates 20, 20a may have screws 21a, openings, recesses, or cornerwise, as shown in FIG. 2, to secure stanchions 1 thereto. Stanchions may be stiffened as shown in FIG. 7 with nested channels using stanchion stiffener 1b and 1. Stanchion stiffener 1b may be a decorative cover also. Corner stanchion 1 may use a spacer block 1f.

In FIG. 8 is shown the preferred arrangement where the rear stanchions 1 is fitted cornerwise such that one leg of stanchion 1 serves to limit media entry while the channel can still hold thin compressible element 4a to stabilize the rear of media preventing rocking. Screw 21 secures stanchion 1 to end plate 20 allowing corner of media A to enter channel and rest against thin compressible element 4a.

Compressible element 4, in at least the front stanchions, are chosen from a range of materials including carpet, foam, bristle, rubber strips, cushion material, rope, spring, or, preferably, zero-set urethane foam rubber. Filler strips 1d, 1b, and 1e shown in FIGS. 4 and 9 may be used to reduce thickness of compressible elements 4 and to secure it therein. FIGS. 4, 6, 8, and 9 show various compressible elements 4 such as rubber strip forced into a u-shape with filler strip 1d, tubing 4c, foam or carpet 4a, and the preferred embodiment, as an protruded strip in FIG. 9 trapped in the flanged channel stanchion 1 by wedged filler strip components 1b and 1e. The flanged channel stanchion design eliminates the possibility of compressible elements' 4 unwanted pull-out from stanchion 1. Such a design (FIG. 9) also provides a smooth, rounded entry for media A reducing wear and reducing entry force of media A.

Compression elements 4 have a front to back dimension (thickness) such that when inserted in stanchion 1, compressible elements 4 protrudes to define a space between facing compressible elements 4 that is slightly less than media A width. When media A is inserted between stanchions 1, the facing compressible elements 4 undergo a small local deformation 10 (FIG. 3), producing a clamp force 10a on the media A sufficient to hold the media against gravity. By this means, media can be readily inserted anywhere along the length of stanchion 1 (vertical in FIGS. 1 and 2), and likewise readily removed. Further, media may remain in place and can be slid along the stanchions (vertically in FIGS. 1–3) to a preferred location. This eliminates having to remove and replace all media to make room for new media while maintaining file order (i.e., alphabetic filing).

Stanchions 1 may be several feet in length to hold, in a stacking manner, large numbers of media A. In such a case, the stanchions would have to be very thick to resist the combined compression force 10a acting on each piece of media otherwise the stanchions 1 would bow and the compressive force 10 would be lost in the mid-length region of the stanchion 1. Such thick stanchions would make the rack expensive and heavy, both undesirable features. To overcome this, the present invention includes a sliding tension plate 21, shown in FIG. 1, which serves to prevent the opposing stanchions from bowing, Several such tension plates 21 may be employed to ensure maximum resistance to bowing along the length of a long rack. Tension plate 21 slides along stanchion 1 to allow filing convenience. Tension plate may be reduced in size to wire or strips or permanent rods 2 fixed to opposing or facing stanchions 1.

To create a uniform front alignment of media within the present rack, rear post 6 may be used as a media position limiter. In FIGS. 5, 7, and 8 are shown other methods of limiting media A, where the rearward leg of channel shaped stanchion 1 is elongated 1a to create an integral limiter for media A. Preferred method is shown in FIG. 8 where stanchion 1 is corner mounted to serve both a support and a locating function.

End plates 20 and 20a in FIG. 2 are used to positively locate stanchions 1 and provide convenience for sit on or mount to shelves and walls.

In the simplest embodiment shown in FIG. 1 the tie bar 2 serves to secure stanchions 1 together and resist compressive force 10a. This embodiment may be integrated into a cabinet or other piece of furniture. In such an embodiment the present rack would be attached to the inner walls of, say, a stereo cabinet.

I claim:

1. A rack for holding at least one article, said article having a width, a length, and a thickness,
    said rack comprising,
        a first stanchion and at least a second stanchion each having end portions for attachment and each having center portions in facing alignment,
        at least two support means for said end portion said first and second stanchions,
        said support means defining first article space between said center portions of said first and second stanchions,
        said first article space being greater than either said width or said length of said article,
        at least one said first stanchion and said second stanchion having a respective compression element attached along said center facing portion,
        said compression elements each having an active face protruding from a respective one of said stanchions so as to define a second article space within said first article space, where said second article space is less than said width or said length of said article,
        wherein that said article is held by said compression element when said article is inserted between said first and said second stanchions.

2. The rack of claim 1 wherein each of said stanchions is a flanged channel member, said compression elements being mounted within said flanged channels under compression such that said active face protrudes from said channel.

3. The rack of claim 1 wherein said compression element is an elastomeric foam.

4. The rack of claim 3 wherein said elastomeric foam is a zero set urethane foam rubber.

5. The rack of claim 3 further including a third and fourth stanchion in a facing relationship, each of said third and fourth stanchions having a compression element attached thereto.

\* \* \* \* \*